United States Patent Office 3,810,888
Patented May 14, 1974

3,810,888
COMPLEX FORMING POLYMERS
Robert Chapurlat, Ecully, and Emile Kuntz, Lyon, France, assignors to Rhone-Poulenc S.A., Paris, France
No Drawing. Original application July 28, 1970, Ser. No. 59,024, now abandoned. Divided and this application June 19, 1972, Ser. No. 266,527
Int. Cl. C07d 31/42
U.S. Cl. 260—240 D     3 Claims

ABSTRACT OF THE DISCLOSURE

Complex forming polymers, having repeat units

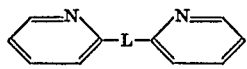

joined to each other by polyvalent linking groups, where L is a direct bond or an O, S, CO, $CHR_1$ or $NR_1$ link ($R_1$ being hydrogen or alkyl) and the pyridyl rings may be substituted by alkyl or linked to each other at positions ortho to the L link by a $-CR_1=CR_1-$ group, are useful for complexing non-alkaline metal atoms. They will form complexes in an acidic medium and when the metal is itself already part of a complex ion. The complexed polymers are useful as catalysts and, as are the complex forming polymers, as varnishes for coating metal. The polymers are prepared by a variety of vinyl-type polymerizations and polycondensations. Particularly useful intermediates

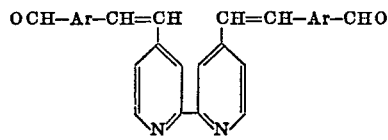

where Ar is aryl are prepared from the aryl dialdehyde and 4,4'-dimethyl-2,2'-dipyridyl.

---

Division of application Ser. No. 59,024, filed July 28, 1970, now abandoned.

The present invention relates to new complex-forming polymers, to processes for their preparation, to various applications of these polymers and to certain monomers useful in the preparation of the polymers.

Various types of complex-forming polymers are known. Their principal value resides in their ability to complex certain metal ions.

The complex-forming polymers according to the present invention are macromolecular compounds containing repeat units of formula:

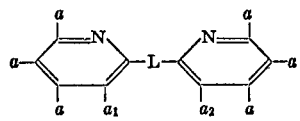   (I)

in which:

L represents a valency bond or the divalent radical $-O-$, $-S-$, $-CO-$, $-CHR_1-$ or $-NR_1-$, $R_1$ being hydrogen or a lower alkyl group, and the symbols $a$, $a_1$, and $a_2$ each represent hydrogen or a valency bond, the number of these symbols representing a valency bond being 1 or 2, or a lower alkyl group, or $a_1$ and $a_2$ together represent the radical $-CR_1=CR_1-$, the said units of Formula I being joined together by one or more polyvalent radicals R.

In the case where $a_1$ and $a_2$ represent hydrogen and L represents a valency bond, the unit of Formula I is more precisely called a "dipyridyl unit"; in the case where $a_1$ and $a_2$ together represent the $-CH=CH-$ radical and L represents a valency bond, the unit of Formula I is more precisely called "o-phenanthroline unit." It is of course understood that in these two cases the representation of these units by the formulae:

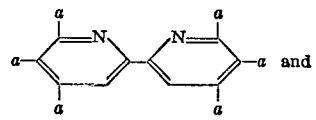 and

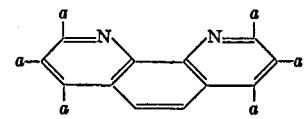

is purely formal in character and that, in reality, the electrons are delocalized in accordance with the classical state of aromatic nuclear systems.

The polyvalent radical R, which is a linking agent may represent radicals $R_A$ or $R_B$ as set out below:

$R_A$ represents an organic or inorganic divalent radical which can, for example, consist of a radical or of a succession of several radicals $R_2$, $R_3$ and Y, as follows:

$R_2$ represents a saturated or unsaturated, linear or branched alkylene radical which may optionally carry hydroxyl or oxo substituents and may optionally carry alkano or alkeno bridges, with the total number of carbon atoms of the radical $R_2$ being preferably less than 12, $R_3$ represents an arylene radical such as phenylene, or a divalent heterocyclic radical, and Y represents an $-O-$, $-S-$, $-SO_2$, $-NH-$, $-\underset{R_4}{N}-$, $-N=N-$, $-\underset{O}{N=N}-$,

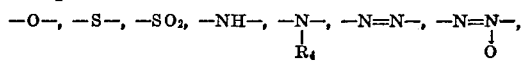

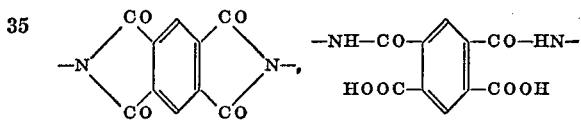

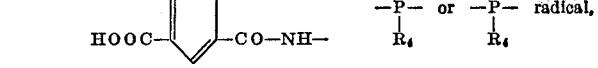 radical, $R_4$ being a lower alkyl radical or an aryl radical such as phenyl.

$R_B$ represents a polyvalent macromolecular radical, for example, of formulae:

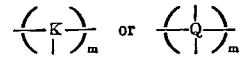

in which K represents a trivalent organic radical, Q represents a tetravalent organic radical, $m$ represents a positive integer, and K, Q and $m$ are such that $\{KH\}_m$ and $\{QH_2\}_m$ represent polymers such as polyolefins, polyethers, polyamides, polyesters, polyimides, polyurethanes, vinyl polymers or acrylic polymers.

The complex-forming polymers derived from linking agents of type $R_A$ are called complex-forming polymers of type $P_A$ and the derivatives of linking agents of type $R_B$ are called complex-forming polymers of type $P_B$.

The complex-forming polymers of type $P_A$ consist of an alternation of units of Formula I and linking agent $R_A$.

The complex-forming polymers of type $P_B$ consist of a macromolecular chain on which the units of Formula I form side branches and can optionally simultaneously be linked to other macromolecular chains. In this specification, the term "lower alkyl group" means one having up to 6 carbon atoms.

Various processes for the preparation of complex-forming polymers according to the invention can be used.

According to a first group of methods of preparation, polymerization is carried out employing at least one dinitrogenous monomer having at least one suitable reactive group (by a dinitrogenous monomer we mean a monomer of which all or at least part of the structural skeleton is identical to the skeleton of the compound of formula:

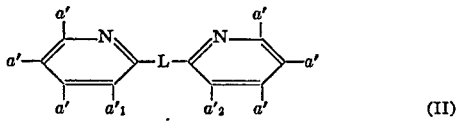
(II)

in which $a'$, $a'_1$ and $a'_2$ have the same meanings respectively as $a$, $a_1$ and $a_2$ in Formula I, above except they do not represent a valency bond).

This polymerization can be a so-called vinyl polymerization or a polycondensation.

If a vinyl polymerization is carried out, the dinitrogenous monomer may be derived from the compound of Formula II and have one or more olefinically unsaturated substituents, such as substituents of formulae:

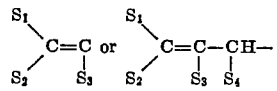

in which $S_1$, $S_2$, $S_3$ and $S_4$, which may be identical or different, each represent hydrogen or a lower alkyl group.

If a polycondensation is carried out, the dinitrogenous monomer employed may be derived from the compound of Formula II and have one or more substituents which can participate in polycondensation reactions.

For the purpose of preparing complex-forming polymers of type $P_A$, the monomers preferably are of formula:

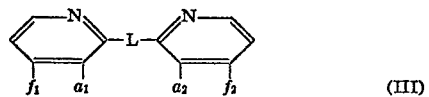
(III)

in which $f_1$ and $f_2$, which may be identical or different, each represent reactive groups of formula —R'—Z, wherein R' represents a valency bond or a radical or a succession of radicals such as $R_2$, $R_3$ and Y, of which the two free valencies are carried by carbon atoms, and Z represents a group such as formyl, amino, hydroxyl, hydroxycarbonyl, chlorocarbonyl, or isocyanato and can also represent hydrogen in the case where R' represents a methylene radical.

The dialdehyde monomers, of Formula III, in which $f_1$ and $f_2$ have the formula —R'—CHO, can be polycondensed with ketones or amines.

Their polycondensation with ketones can, for example, be carried out in accordance with the techniques described in Belgian Pat. No. 714,325. If the ketone has the formula:

$$R_5—CH_2—CO—CH_2—R_6$$

in which $R_5$ and $R_6$, which may be identical or different, each represent alkyl, cycloalkyl or aryl radicals or optionally together form a divalent alkylene radical, the complex-forming polymer according to the invention then comprises repeat units of formula:

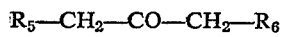
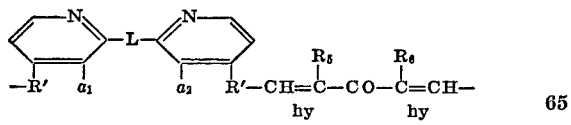

in which the suffix "hy" placed under a double bond indicates that the latter can optionally be in the hydrated form (—CHOH—CH₂—).

The polycondensation of a dialdehyde monomer of Formula III in which $f_1$ and $f_2$ have the formula —R'—CHO with a diamine can be effected in accordance with the various techniques described by G. F. d'Alelio et al. (J. Macromol. Sc. A₂ (2) 237–333 (1968)). If the diamine employed has the formula NH₂—R₇—NH₂, in which $R_7$ is a radical or a succession of radicals such as $R_2$, $R_3$ and Y, of which the two free valencies are carried by carbon atoms, the complex-forming polymer so obtained comprises repeat units of formula:

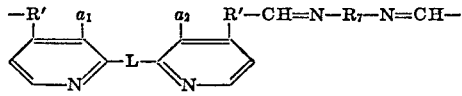

The diamine monomers of Formula III in which $f_1$ and $f_2$ represent —R'—NH₂ radicals can be polycondensed, in accordance with the conventional methods, with diacids, dichlorides of diacids, dianhydrides and diisocyanates and the resulting complex-forming polymers according to the invention are polyamides, polyimides or polymers with urea units.

In particular, if a diamine monomer of Formula III in which $f_1$ and $f_2$ represent —R'—NH₂ radicals is polycondensed with a dianhydride of formula:

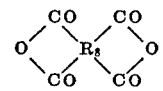

in which $R_8$ represents a tetravalent organic radical containing at least two carbon atoms, the polymer thus obtained comprises repeat units of formula:

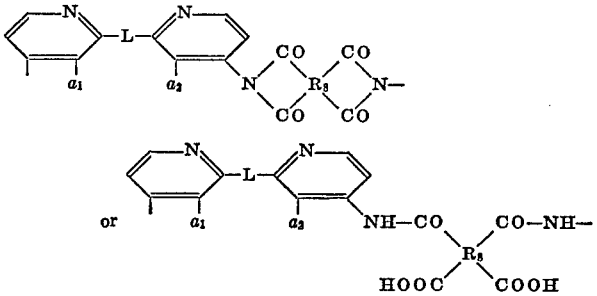

If a diamine monomer of Formula III in which $f_1$ and $f_2$ represent —R'—NH₂ radicals is polycondensed with a diisocyanate of formula OCN'—R₉—NCO in which R₉ has the meanings given for $R_A$, a polymer with urea units is obtained having repeat units of formula:

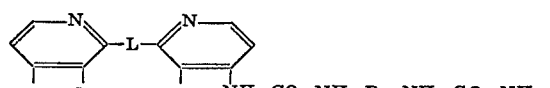

Dimethylated monomers of formula:

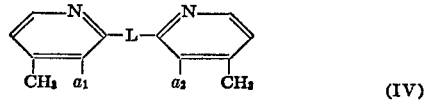
(IV)

can give rise to polycondensates in various ways.

Under the dehydrogenating action of sulphur, they can give rise to complex-forming polymers having repeat units of formula:

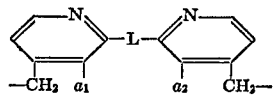

This polycondensation can be carried out in accordance with a technique similar to that known for the picolines (H. I. Thayer et al., J. Am. Chem. Soc. 70 2330–3 (1948)).

With dianhydrides of formula:

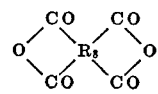

the dimethylated monomers of Formula IV can give rise to complex-forming polymers comprising repeat units of formula:

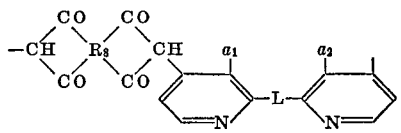

This latter polycondensation can be carried out by simple heating of the mixture of the reagents, preferably in the presence of a dehydrating agent and at a temperature above 100° C.

The dimethylated monomers of Formula IV can furthermore be polycondensed with dihalogenated derivatives of formula X—R$_7$—X wherein X represents a halogen atom and R$_7$ represents a divalent radical as defined above. The resulting complex-forming polymers have repeat units of formula:

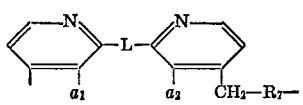

This polycondensation can be carried out according to a technique similar to that known for the picolines (A. E. Tchitchibabine, Bull. Soc. Chim. Fr. pp. 1607–1633 (1938); H. Normant, Bull. Soc. Chim. Fr. pp. 791–806 (1968)).

The dimethylated monomers of Formula IV can also be polycondensed with olefines and, more particularly, with divinyl derivatives of formula $$CH_2=CH-R_{10}-CH=CH_2$$

in which R$_{10}$ can represent a valency bond or a divalent radical such as R$_2$ or R$_3$. The resulting complex-forming polycondensates have repeat units of formula:

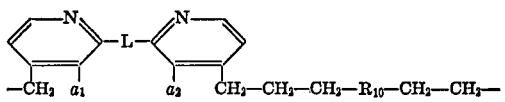

This polycondensation can be achieved in accordance with a technique similar to that known for the picolines (R. Wegler et al. Ber. 83, 6–10 (1950)).

Dihydroxy monomers of Formula III in which $f_1$ and $f_2$ represent —R′—OH radicals can give rise to complex-forming polymers by reaction with diacids, dianhydrides or dichlorides of acids (to give polyesters) or diisocyanates (to give polyurethanes).

Dicarboxylic monomers of Formula III in which $f_1$ and $f_2$ represent —R′—COOH radicals can give rise to complex-forming polymers by reaction with diols (to give polyesters) or diamines (to give polyamides).

Isocyanato monomers of Formula III, in which $f_1$ and $f_2$ represent —R′—NCO radicals can give rise to complex-forming polymers by reaction with diols (to give polyurethanes) or diamines (to give polyureas).

According to a further method of preparing the complex-forming polymers according to the invention, a dinitrogenous monomer is attached to a previously produced polymer. It is, for example, possible to react a polymer of formula

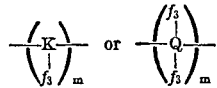

with a dinitrogenous monomer derived from the compound of Formula II and having at least one substituent $f'_3$, the radicals $f_3$ and $f'_3$ being capable of reacting together in a condensation reaction.

This method of preparation gives rise to complex-forming polymers of the type P$_B$ defined above.

Examples of radicals $f_3$ and $f'_3$ include radicals having carboxy/hydroxyl, chlorocarbonyl/hydroxyl and anhydride/hydroxyl groups, which give rise to polyesters, carboxyl/amino and chlorocarbonyl/amino which give rise to polyamides, hydroxyl/isocyanate which gives rise to polyurethanes, and hydroxyl/aldehyde which gives rise to polyacetals.

In particular, a complex-forming polymer of type P$_B$ can be prepared by reacting a polymer with hydroxyl groups, such as a homopolymer or copolymer of vinyl alcohol, in the presence of an acid, with a dinitrogenous monomer having at least one aldehyde group, such as a compound of formula:

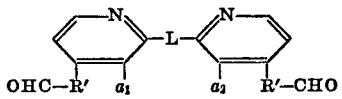

This acetalization can optionally be carried out in the presence of other aldehydes, such as formaldehyde, or their precursors, such as trioxymethylene.

The complex-forming polymers according to the invention can, depending on their nature and their method of preparation, be obtained in the solid state or in solution or in suspension; they are preferably stored in the moist state, in solution or in suspension.

From amongst the numerous polymer types described above, the preferred polymers according to the invention are:

(1) Polymers having repeat units:

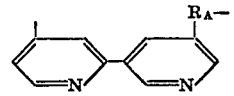

wherein R$_A$ represents a divalent radical:

(a)

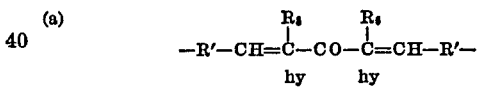

in which R$_5$ and R$_6$ represent hydrogen or an alkyl radical with 1 to 4 carbon atoms or together form an alkylene radical having 2 or 3 carbon atoms, and R′ represents the —CH=CH—Ar′ radical, Ar′ being the m-phenylene, p-phenylene or p-diphenylene group, and hy indicates that the double bond may optionally be hydrated or:

(b)    —NH—CO—NH—R$_9$—NH—CO—NH— in which R$_9$ has the formula:

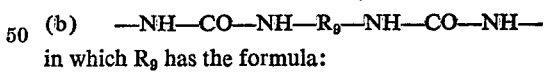
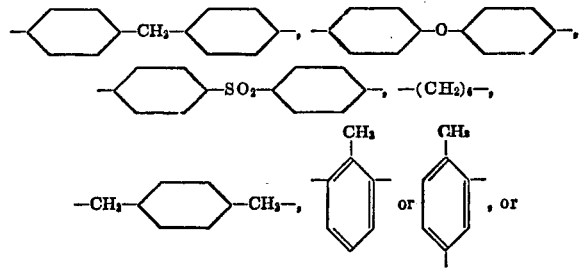

(c) —(CH$_2$)$_n$— in which $n$ has a value of 1 to 10, or (d)

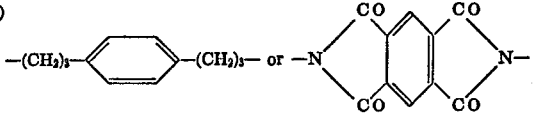

(2) Polymers having repeat units

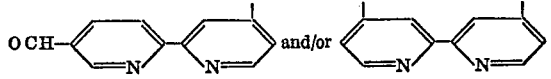

linked to one another by macromolecular radicals $R_B$ having a repeat unit

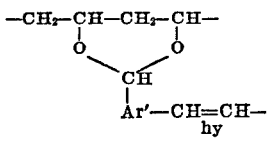

wherein Ar' and hy have the significance given above.

The preferred processes for preparation of the polymers are those described above in which the reagents are chosen to give the preferred products indicated above.

The present invention also relates to the application of the complex-forming polymers described above to the preparation of addition compounds, especially salts of complex-forming polymers, and of complexed polymers.

The salts of complex-forming polymers are obtained by linking acids not containing a metal atom to the units of Formula I of the complex-forming polymers. More precisely, these salts may be prepared by reaction of the acid with the complex-forming polymer. This reaction can be carried out either by immersing the solid complex-forming polymer in a solution of the acid or by mixing a solution of the acid and a solution of a complex-forming polymer.

The complex polymers are macromolecular compounds containing repeat units of formula:

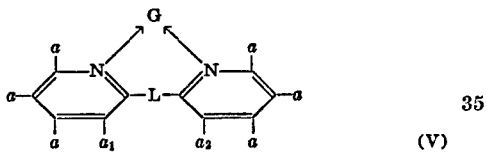

linked to one another by one or more linking agents R, the meanings of R, $a$, $a_1$, $a_2$ and L being the same as those given above, and G being a non-alkaline metal atom or an ionic compound, such as salts or acids containing at least one non-alkaline metal atom.

The coördination bonds indicated in Formula V join the nitrogen atoms to the metal atom contained in G. If G represents a salt, the non-alkaline metal atom can be contained either in the anion or in the cation.

If G represents an ionic compound, the metal atom which is directly linked to the nitrogen atoms by coordination bonds can optionally and additionally comprise other coordination, covalent or electrovalent bonds which link it to other ions, atoms or molecules.

Examples of salts G which can be used include ordinary metal salts such as the halides, nitrates, sulphates, phosphates, formates, acetates, propionates and stearates; salts which contain a complex cation such as the oxo-cations derived from titanium, vanadium, zirconium and molybdenum, hafnium, niobium, tungsten and uranium; salts containing a complex anion such as $PdCl_4$ and, more generally, anionic metal complexes of the halides, cyanide, thiocyanate, thiosulphate and orthophosphate anions.

Examples of acids containing at least one non-alkaline metal atom, include $H_2PtCl_6$ and $H_2PdCl_4$ and, more generally, the acids corresponding to the previously quoted salts containing a complex anion.

The complexed polymers described above can additionally, or optionally comprise repeat units of Formula I which have been salified by an acid which does not contain a metal atom, and can hence partly constitute salts of complex-forming polymers.

Complexed polymers comprising repeat units of Formula V, in which G represents an ionic metal compound, can be prepared by bringing together a solution of an ionic compound with the complex-forming polymer or one of its salts, in the solid state or in solution.

If a complexed polymer derived from an ionic compound is prepared starting from a solid complex-forming polymer, various techniques can be employed such as:

(a) the complex-forming polymer, reduced to a fragmented form, such as a powder or granules, is stirred in an aqueous solution containing an ionic compound, and the solid material, which is the desired complexed polymer is then isolated.

(b) a solution of an ionic compound is brought into contact with the solid complex-forming polymer in accordance with conventional liquid-solid chromatography techniques.

If a complexed polymer derived from an ionic compound is prepared starting with a solution of a complex-forming polymer, it is advantageous to bring this solution together with a solution of the ionic compound. Depending on the nature of the solvents employed, of the complex-forming polymer and of the metal ion, the complexed polymer obtained can either remain in solution or precipitate. Depending on the particular case, the complexed polymer is isolated either by filtration or by distillation of the solvents and removal of the non-complexed ions by washing, or by precipitation with a non-solvent followed by a filtration.

The preparation of complexed polymers comprising repeat units of Formula V in which G represents a metal atom, is usually effected by reduction of the metal atoms of a complexed polymer comprising repeat units of formula:

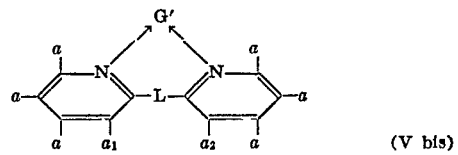

in which G' represents an ionic compound derived from the metal G. This reduction is usually effected with hydrogen, at a temperature between 0° C. and the decomposition temperature of the complex-forming polymer.

The complex-forming polymers according to the invention are particularly valuable in numerous industrial applications, firstly because of their ability to complex metal ions excluding alkaline ions, and of doing so even in an acid medium, secondly, because the complex formation takes place without ion exchange, and finally, because of their ability to complex anions which are themselves complex.

Typical industrial applications include:

(a) the extraction of precious metals, of rare earths and of radioactive elements such as uranium from their minerals, (b) the separation of radioactive caesium from other metals, (c) the separation of various non-alkaline metals from one another: the complex-forming polymers according to the invention complex certain metals more strongly than others, (d) the recovery of chromium salts from tannery waste liquors, (e) the demineralization of organic solvents without introducing foreign ions, for the purpose of preparing dielectric liquids, and (f) the purification of industrial effluents. It is known that the activity of bacteria used to destroy organic waste material in industrial effluents can be inhibited by certain metal ions such as the cupric ion. The presence of frequently large amounts of alkaline ions in these effluents prevents the use of ion exchange resins of the conventional type for the removal of these undesired ions. The complex-forming polymers according to the invention on the other hand can advantageously be used to remove the undesired ions in these circumstances.

After extraction of the metal ions from the medium in question, the resulting complexed polymers can be reconverted into complex-forming polymers, for example by elution. The eluant may be a strong acid or a complex-forming agent such as ethylene diamine or ethylenediaminotetraacetic acid.

The complexed polymers comprising repeat units of Formula V, in which G represents a metal atom, can be used as catalysts, especially in hydrogenation, dehydrogenation and isomerization reactions.

The complexed and complex-forming polymers according to the invention can also be used as varnishes for coating metals.

The present invention also provides dialdehydes of Formula III in which $a_1$ and $a_2$ are hydrogen atoms and $f_1$ and $f_2$ represent —R'—CHO groups.

More particularly, these dialdehydes have the formula:

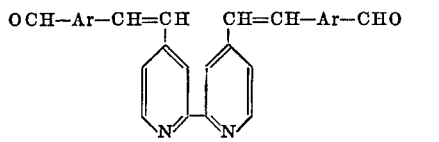

(VI)

in which Ar represents a divalent radical comprising at least one aromatic nucleus, preferably the m-phenylene or p-phenylene radical, or a radical of general formula:

(VII)

in which Y represents a valency bond or a divalent radical such as —CO—, —CH$_2$—, —CT$_2$—, —O—, —SO$_2$—, T being an alkyl radical having 1 to 4 carbon atoms.

These dialdehydes can be prepared by heating mixtures containing 4,4'-dimethyl-2,2'-dipyridyl and a dialdehyde of formula

wherein Ar has the previously indicated significance. The molar ratio of dialdehyde to dimethyldipyridyl is usually between 1:1 and 5:1 and they may be heated to a temperature generally above 100° C., preferably above 130° C., but below the degradation temperature of the reagents and of the reaction product. Generally, the reaction temperature does not exceed 200° C.

To obtain optimum yields, it is advantageous to incorporate a dehydrating agent which is inert towards the reagents into the reaction medium. To avoid local overheating of the reaction medium, it is advantageous to carry out the process in a medium which is a solvent for the reagents. These two procedures can be combined by incorporating into the reaction medium a fatty acid anhydride derived from an acid preferably possessing less than 12 carbon atoms. Acetic anhydride is one such anhydride which is readily available in industry.

After reaction, the dialdehyde of Formula VI can be isolated by various methods, especially by selectively dissolving the unreacted products, for example by means of volatile solvents such as alcohols, followed by filtration. The dialdehyde obtained can be recrystallized using polar solvents such as dimethylformamide or N-methylpyrrolidone-2.

The dialdehydes according to the invention can be used as reagents in mineral analysis.

The following examples are given to illustrate the invention.

EXAMPLE 1

A complex-forming polymer of the aldehyde/ketone type is prepared:

(A) In a first stage, 4,4'-bis(p-formylstyryl)-2,2'-dipyridyl is prepared by condensation of 4,4'-dimethyl-2,2'-dipyridyl and terephthaldehyde.

55 g. of 4,4'-dimethyl-2,2'-dipyridyl, 121 g. of terephthaldehyde and 180 g. of acetic anhydride are introduced into a 500 cm.³ flask fitted with a reflux condenser. The mixture is heated under reflux for 12 hours and filtered hot; the precipitate is washed with 600 cm.³ of boiling acetic anhydride and then with 500 cm.³ of boiling pyridine and is dried at 50° C. under 200 mm. of mercury pressure for 12 hours. The resulting solid weighs 95 g. It is dissolved hot in 500 cm.³ of N-methylpyrrolidone (NMP), the solution is cooled and the product is filtered off, washed with 150 cm.³ of NMP and dried under 200 mm. of mercury pressure at 50° C. for 12 hours.

79 g. of 4,4'-bis(p-formylstyryl)-2,2'-dipyridyl of formula:

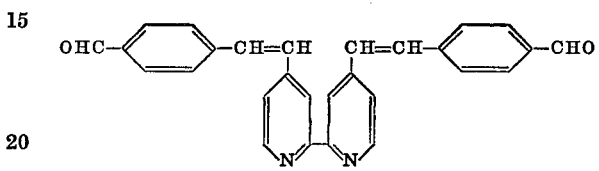

are obtained.

(B) In a second stage, this dipyridyl derivative is polycondensed with cyclohexanone.

14.0 g. of 4,4'-bis(p-formylstyryl)-2,2'-dipyridyl and 900 cm.³ of dimethylformamide (DMF) are introduced into a one litre Erlenmeyer flask. The dialdehyde is dissolved by boiling the mixture. Thereafter, boiling is continued and 3.68 g. of cyclohexanone are first added, followed by 200 cm.³ of sodium hydroxide solution (2.5 N) added dropwise over the course of 1 hour. The mixture is filtered hot. The precipitate is washed with 2 litres of water and dried at 50° C. under 200 mm. of mercury pressure for 12 hours.

12.6 g. of a yellow-brown powder which is insoluble in dimethylformamide, dimethylsulphoxide and acids and which comprises repeat units of formula:

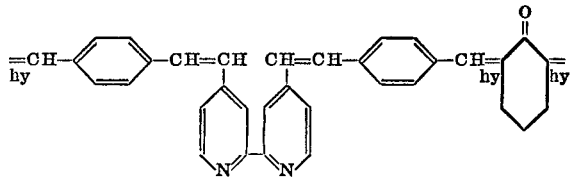

in which the suffix hy has the same significance as given previously, are obtained.

(C) 0.1 g. of the complex-forming polymer prepared as described in paragraph B is stirred, at about 20° C., with 50 cm.³ of water in which 5 micromols of cupric sulphate and 3.125 millimols of sodium sulphate have been dissolved. After 12 hours stirring, 1.5 micromols of cupric salt and the amount of sodium salt initially employed remain in solution.

(D) 0.25 g. of the complex-forming polymer prepared as described in paragraph B is stirred, at about 20° C., with 50 cm.³ of water in which 1 millimol of uranyl acetate has been dissolved. After 12 hours stirring, 0.046 millimol of uranyl salt remains in solution.

(E) 0.25 g. of the complex-forming polymer prepared as described in paragraph B is stirred, at about 20° C. with 50 cm.³ of water in which 1 millimol of cupric chloride has been dissolved. After 12 hours stirring, 0.195 millimol of cupric salt remains in solution.

(F) The procedure described in paragraph D is repeated, replacing the uranyl acetate by cupric acetate and the water by ethyl alcohol.

After 12 hours' stirring, 0.056 millimol of cupric salt remains in solution.

EXAMPLE 2

A complex-forming polymer is prepared by polycondensation of the aldehyde/ketone type.

1.5 l. of dimethylformamide and 15 g. of 4,4'-bis(p-formylstyryl)-2,2'-dipyridyl are introduced into a 2 litre flask and the mixture boiled so that the dialdehyde dissolves. The solution is cooled to 55° C. and 2.32 g. of acetone and 15 cm.³ of a 40% by weight aqueous solution of tetrabutylammonium hydroxide added. A new solution, which in the present example and in the following example is described as a collodion, is obtained. This collodion is concentrated to a volume of 200 cm.³ by distillation under 20 mm. of mercury pressure and is then poured into one litre of ethyl ether. The resulting precipitate is filtered off, washed with one litre of water and dried at 50° C. under 200 mm. of mercury pressure for 12 hours.

14.5 g. of a polycondensate comprising repeat units:

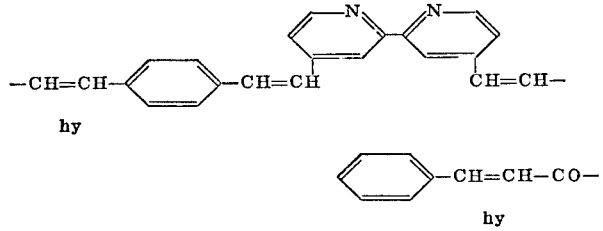

are obtained.

EXAMPLE 3

Various derivatives of the complex-forming polymer prepared in Example 2 are prepared.

(A) 50 cm.³ of the collodion mentioned in Example 2, and 100 cm.³ of a M/1000 solution of cupric nitrate in dimethylformamide, both previously heated to 50° C. are mixed together. An immediate precipitate of complexed polymer, having repeat units of formula:

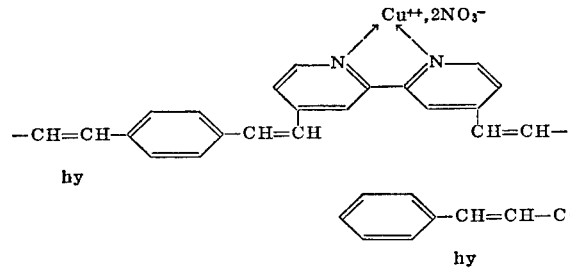

is observed.

(B) The procedure of paragraph A is repeated replacing cupric nitrate by $Ba(NO_3)_2$, $BaCl_2$, $CaCl_2$, $MgCl_2$, $MgSO_4$, $Ca(NO_3)_2$, $SrCl_2$, $CuCl_2$, $CuSO_4$, $Cu(CH_3COO)_2$, $CoCl_2$, $Co(NO_3)_2$, $Co(CH_3COO)_2$, $NiSO_4$, $VOSO_4$ and $TiOSO_4$.

These various salts give results similar to those obtained with cupric nitrate.

(C) The preceding experiment is repeated with $MnSO_4$ and $CrCl_3$. The precipitate of complexed polymer is only obtained on cooling to 20° C.

(D) The procedure described in paragraph A is repeated, replacing the copper salt by hydrochloric acid. A precipitate of a salt of complex-forming polymer is obtained at 50° C.

EXAMPLE 4

A complex-forming polymer is prepared by polycondensation of a diisocyanate and a diamine.

25 cm.³ of freshly distilled dimethylformamide (DMF) and 4.64 g. of 4,4'-diamino-2,2'-dipyridyl are introduced into a 250 cm.³ flask equipped with a stirrer, a dropping funnel and a thermometer. 25 cm.³ of DMF in which 6.25 g. of 4,4'-diisocyanatodiphenylmethane have previously been dissolved are then run into the flask over the course of 2 minutes. After 30 minutes, the reaction mixture is poured into 800 cm.³ of water. The mixture is filtered, the precipitate is washed with 1000 cm.³ of N/10 sulphuric acid and then with 200 cm.³ of water, and dried at 50° C. under 200 mm. of mercury pressure. 11.2 g. of a polycondensate comprising repeat units of formula:

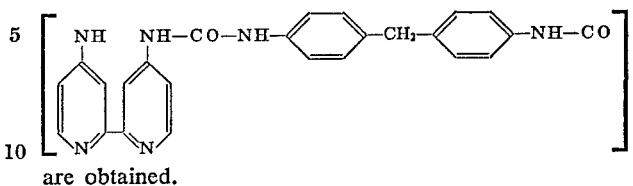

are obtained.

EXAMPLE 5

400 cm.³ of dimethylformamide and 4.16 g. of 4,4'-bis(p-formylstyryl)-2,2'-dipyridyl are introduced into a one litre Erlenmeyer flask, the mixture boiled to dissolve the dialdehyde and allowed to cool to 60° C. 1.08 g. of cyclohexanone and 10 g. of a 40% by weight aqueous solution of tetrabutylammonium hydroxide are then added. This solution, which has a blood-red color, is called solution A.

A solution B is prepared by dissolving 4.76 g. of cobalt (II) chloride hexahydrate in 200 cm.³ of dimethylformamide at 60° C.

The two solutions A and B are heated to 60° C. and B is then poured into A. The mixture is cooled and filtered. The precipitate is washed with water and dried in vacuo (200 mm. of mercury pressure) and at ambient temperature in a desiccator containing phosphorus pentoxide. 7.6 g. of a complex-forming polymer comprising repeat units of formula:

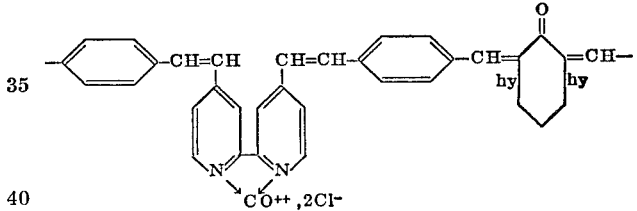

are obtained.

EXAMPLE 6

A complex-forming polymer is prepared by polycondensation of a dianhydride and a diamine.

6.2 g. of 4,4'-diamino-2,2'-dipyridyl, 7.28 g. of pyromellitic anhydride and 150 cm.³ of dimethylacetamide are introduced into a 250 cm.³ flask equipped with a stirrer, a thermometer and a reflux condenser separated from the ambient atmosphere by means of a tube packed with phosphorus pentoxide.

The mixture is heated to 70° C. and 10.2 g. of acetic anhydride and 0.79 g. of pyridine are added. The temperature is maintained for 30 minutes and the reaction mixture is poured into 2 liters of water. The precipitate is filtered, washed with 2 liters of water and then dried for 12 hours at 50° C. under 200 mm. of mercury pressure.

13.25 g. of a complex-forming polymer containing repeat units of formula:

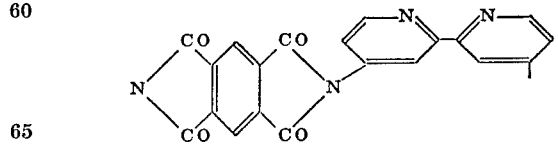

are obtained.

EXAMPLE 7

300 cm.³ of freshly distilled pyridine, 18.4 g. of 4,4'-dimethyl-2,2'-dipyridyl and 12 g. of sodamide are introduced into a 500 cm.³ flask equipped with a stirrer, a dropping funnel and a reflux condenser.

The mixture is stirred for 4 hours at ambient temperature and 23 g. of 1,5-dibromopentane are then added dropwise. The mixture is heated under reflux for 12 hours and filtered and the product is then successively washed with 1000 cm.³ of water, 500 cm.³ of ethyl alcohol, 250 cm.³ of N hydrochloric acid and 250 cm.³ of water and finally dried at 50° C. under 200 mm. of mercury pressure for 12 hours.

13.5 g. of a complex-forming polymer having repeat units of formula:

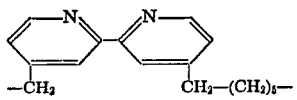

are obtained.

EXAMPLE 8

Three solutions A, B and C as defined below are mixed in a 500 cm.³ Erlenmeyer flask:

Solution A is 0.4 g. of 4,4'-bis(p-formylstyryl)-2,2'-dipyridyl dissolved in 40 cm.³ of dimethylsulphoxide (DMSO). Solution B is 2 g. of polyvinyl alcohol (saponification number:100) dissolved in 40 cm.³ of DMSO. Solution C is 2.5 N aqueous hydrochloric acid.

A fourth solution containing 16 g. of trioxymethylene dissolved in 120 cm.³ of DMSO is thereafter added to the mixture of solutions A, B and C.

The resulting mixture is cast onto a glass plate 12 cm. x 25 cm. and kept for 48 hours at 55° C. under an absolute pressure of 200 mm. of mercury. A film of complex-forming polymer consisting of polyvinyl alcohol acetalized and crosslinked by bis(p-formylstyryl)dipyridyl and by formaldehyde is obtained; this complex-forming polymer has the units

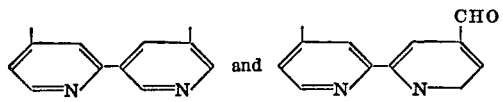

linked to one another by macromolecular radicals having repeat units

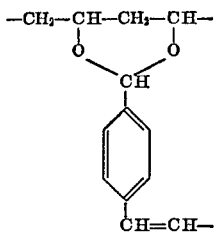

When immersed in an aqueous solution of cupric sulphate, this film becomes green. This color disappears on washing with ethylene diamine.

EXAMPLE 9

13 g. of p-divinylbenzene, 18.4 g. of 4,4'-dimethyl-2,2'-dipyridyl and 140 cm.³ of pyridine are introduced into a 500 cm.³ flask equipped with a stirrer and a reflux condenser. The mixture is heated to 118° C. 46 mg. of sodium are added and heating is continued for a further 15 hours. The mixture is cooled and evaporated at 40° C. under 200 mm. of mercury pressure. The residue is extracted in a Kumagawa extractor with 400 cm.³ of ethanol for 10 hours. The solid which remains is dried at 50° C. under 200 mm. of mercury pressure. 8 g. of a complex-forming polymer having repeat units of formula:

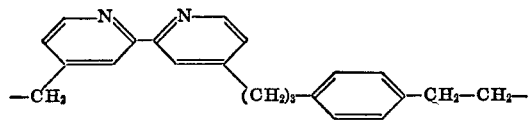

are obtained.

The complex-forming polymer also contains cross-linkings between chains, due to the divinylbenzene.

EXAMPLE 10

(A) A complex-forming polymer is prepared by polycondensation of the aldehyde/ketone type.

1.7 l. of dimethylformamide (DMF) and 41.6 g. of 4,4'-bis(p-formylstyryl)-2,2'-dipyridyl are introduced into a 5 liter flask equipped with a reflux condenser and a dropping funnel. The mixture is boiled to allow the dialdehyde to dissolve, and whilst being kept at the boil, 6.4 g. of acetone dissolved in 50 cm.³ of DMF followed by 100 cm.³ of aqueous 2.5 N sodium hydroxide solution, added dropwise in 1 hour 30 minutes are added successively. The mixture is cooled to 50° C. and 2 liters of water at ambient temperature are added whilst stirring. The whole mixture is filtered and the precipitate is washed with 6 liters of water and stored moist. The complex-forming polymer obtained has repeat units of the same formula as that of Example 2.

Various complex-forming experiments are carried out with this complex-forming polymer in suspension as follows:

(B) A complexed polymer containing palladium of degree of oxidation+II(PdII) is prepared.

10.36 g. of the complex-forming polymer are stirred, at about 20° C., with 500 cm.³ of water in which 18 millimols of hydrochloric acid and an amount of PdII chloride corresponding to 6500 microgram atoms of palladium have been dissolved. After 12 hours' stirring, 50 microgram atoms of palladium remain in solution.

The complexed polymer containing PdII is filtered off.

(C) A complexed polymer containing palladium of degree of oxidation zero is prepared.

0.085 g. of the polymer prepared as described in paragraph B are mixed with 0.915 g. of glass beads; the mixture is introduced into a 2 cm.³ reactor at 350° C.; a stream of nitrogen of 0.5 l./hour is passed through this reactor for 15 minutes followed by a stream of hydrogen of the same flow rate for the same time, followed again by a stream of nitrogen for 15 minutes. A polymer containing palladium of degree of oxidation zero is obtained.

(D) 3.79 g. of the complex-forming polymer prepared as described in paragraph A are stirred, at about 20° C., with 100 cm.³ of an aqueous solution of chloroplatinic acid, $H_2PtCl_6$, containing 1.2 milligram atoms of platinum per litre. After 12 hours' stirring 0.04 milligram atom of platinum per litre remains in solution.

(E) 1.09 g. of the complex-forming polymer prepared as described in paragraph A are stirred, at about 20° C., with 50 cm.³ of water in which 100 micromols of cupric nitrate and 5 millimols of nitric acid have been dissolved. After 12 hours' stirring, 1.8 micromols of cupric salt remain in solution and the pH is 1.0.

(F) 0.965 g. of the complex-forming polymer prepared as described in paragraph A is stirred, at about 20° C., with 50 cm.³ of water in which 100 micromols of cupric nitrate and 50 millimols of sodium nitrate have been dissolved. After 12 hours' stirring, 1.15 micromols of cupric salt and the amount of sodium salt initially employed remain in solution.

(G) 1.109 g. of the complex-forming polymer prepared as described in paragraph A are stirred, at about 20° C., with 50 cm.³ of water in which 100 micromols of ferric nitrate have been dissolved. After 12 hours' stirring, 0.65 micromol of ferric salt remains in solution.

EXAMPLE 11

4 g. of 4,4-dimethyl-2,2'-dipyridyl and 12 g. of terephthaldehyde are introduced, under an inert atmosphere, into a 250 cm.³ flask equipped with a reflux condenser. The mixture is heated to 150° C. for 20 hours and washed with 400 cm.³ of boiling ethanol. The residue is recrystallized from 100 cm.³ of N-methylpyrrolidone-2 and then dried under 200 mm. of mercury pressure at 50° C.

4.5 g. of 4,4'-bis(p-formylstyryl)-2,2'-dipyridyl of formula:

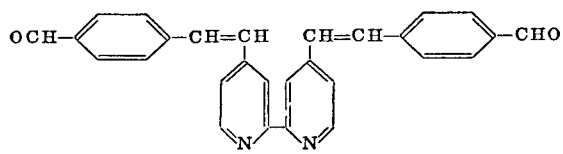

are obtained.

We claim:
1. A dialdehyde of the general formula

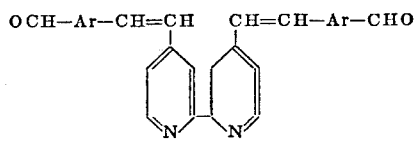

in which Ar represents a divalent radical comprising at least one aromatic nucleus.

2. A dialdehyde according to claim 1 in which the radical Ar represents a m-phenylene or p-phenylene radical or a radical of formula

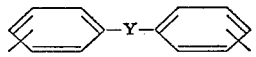

in which Y represents a valency bond or the divalent radical —$CH_2$—, —$CT_2$—, —CO—, —O—, and —$SO_2$—, T being an alkyl radical having from 1 to 4 carbon atoms.

3. The dialdehyde according to claim 1 which is 4,4'-bis-(p-formylstyryl)-2,2'-dipyridyl.

References Cited

Sasse et al.: Chemical Abstracts, vol. 55, cols. 15479 to 15480 (1961).

Cheuychit et al.: J. Chem. Soc., 1964, pp. 4447 to 4560.

JOHN D. RANDOLPH, Primary Examiner

U.S. Cl. X.R.

260—64, 75 N, 77.5 AQ, 78 R, 283 R, 294.8 G, 295 R, 296 D; 423—2, 53, 179

UNITED STATES PATENT OFFICE
CERTIFICATE OF CORRECTION

Patent No. 3,810,888                     Dated May 14, 1974

Inventor(s) Robert Chapurlat and Emile Kuntz

It is certified that error appears in the above-identified patent and that said Letters Patent are hereby corrected as shown below:

In the heading of the patent after the International Classification, there should be -- Claims priority, applications France, July 28, 1969, 69/25747 and August 26, 1969, 69/29196.

Signed and sealed this 18th day of February 1975.

(SEAL)
Attest:

RUTH C. MASON
Attesting Officer

C. MARSHALL DANN
Commissioner of Patents
and Trademarks